United States Patent
Son et al.

(10) Patent No.: US 10,024,375 B2
(45) Date of Patent: *Jul. 17, 2018

(54) ELECTRONIC DISC BRAKE

(71) Applicant: MANDO CORPORATION, Gyeonggi-do (KR)

(72) Inventors: Jong-Gu Son, Seoul (KR); Sung-Wook Yu, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/272,366

(22) Filed: Sep. 21, 2016

(65) Prior Publication Data
US 2017/0082157 A1   Mar. 23, 2017

(30) Foreign Application Priority Data

Sep. 22, 2015 (KR) .................. 10-2015-0133874

(51) Int. Cl.
*F16D 65/00* (2006.01)
*F16D 55/225* (2006.01)
(Continued)

(52) U.S. Cl.
CPC ........ *F16D 65/0006* (2013.01); *B60T 13/588* (2013.01); *B60T 13/741* (2013.01);
(Continued)

(58) Field of Classification Search
CPC .... F16D 65/0006; F16D 55/225; F16D 65/18; F16D 2121/24; F16D 65/183;
(Continued)

(56) References Cited

U.S. PATENT DOCUMENTS 8,348,023 B2 *  1/2013  Sakashita ................ B60T 7/107
                                                188/265
8,790,208 B2 *  7/2014  Poertzgen ............. B60T 13/741
                                                475/149

(Continued)

FOREIGN PATENT DOCUMENTS

KR    10-2011-0072877    6/2011

*Primary Examiner* — Thomas J Williams
*Assistant Examiner* — Mariano Sy
(74) *Attorney, Agent, or Firm* — Ladas & Parry, LLP

(57) ABSTRACT

Disclosed is an electronic disc brake. The electronic disc brake includes a disc configured to rotate with vehicle wheels, a caliper housing configured to operate pad plates installed at both sides of the disc, and an actuator having a piston provided inside the caliper housing to press the pad plates to adhere the pad plates to the disc, a spindle rotatably installed at the caliper housing to reciprocate the piston, an electric motor configured to rotate the spindle, and a decelerator configured to transmit a rotational force of the electric motor to the spindle, wherein the decelerator includes a power connection unit connected to the electric motor, planetary gear units configured to connect the power connection unit to the spindle, and a center pin configured to pass through the power connection unit and the planetary gear units, and the center pin is fitted into the power connection unit and the planetary gear units to be rotatable relative thereto.

7 Claims, 3 Drawing Sheets

(51) Int. Cl.
*F16D 65/18* (2006.01)
*B60T 13/58* (2006.01)
*B60T 13/74* (2006.01)
*F16D 55/226* (2006.01)
*F16D 121/24* (2012.01)
*F16D 125/40* (2012.01)
*F16D 125/50* (2012.01)
*F16D 121/02* (2012.01)
*F16D 125/48* (2012.01)

(52) U.S. Cl.
CPC ......... *F16D 55/225* (2013.01); *F16D 55/226* (2013.01); *F16D 65/18* (2013.01); *F16D 65/183* (2013.01); *F16D 2121/02* (2013.01); *F16D 2121/24* (2013.01); *F16D 2125/40* (2013.01); *F16D 2125/48* (2013.01); *F16D 2125/50* (2013.01)

(58) Field of Classification Search
CPC .............. F16D 55/226; F16D 2125/48; F16D 2125/50; F16D 2125/40; F16D 2121/02; B60T 13/741; B60T 13/588
USPC ....................... 188/72.8, 72.1, 72.3, 156, 162
See application file for complete search history.

(56) References Cited

U.S. PATENT DOCUMENTS

| | | | | |
|---|---|---|---|---|
| 9,410,590 | B2* | 8/2016 | Jang | H02K 7/116 |
| 2002/0049109 | A1* | 4/2002 | Ohmi | F02N 15/046 |
| | | | | 475/159 |
| 2004/0195058 | A1* | 10/2004 | Ina | F16D 65/18 |
| | | | | 188/158 |
| 2013/0087417 | A1* | 4/2013 | Yu | B60T 13/741 |
| | | | | 188/72.3 |
| 2013/0299288 | A1* | 11/2013 | Ryu | F16D 55/226 |
| | | | | 188/72.4 |
| 2014/0034430 | A1* | 2/2014 | Fuse | F16D 55/226 |
| | | | | 188/72.4 |
| 2014/0148295 | A1* | 5/2014 | Ishizuka | F16H 57/0471 |
| | | | | 475/159 |
| 2015/0210253 | A1* | 7/2015 | Qi | B60T 13/741 |
| | | | | 188/162 |
| 2016/0032993 | A1* | 2/2016 | Takei | B60T 13/741 |
| | | | | 701/70 |
| 2016/0327104 | A1* | 11/2016 | Li | F16D 65/0006 |
| 2017/0082158 | A1* | 3/2017 | Son | F16D 55/226 |
| 2017/0082159 | A1* | 3/2017 | Son | F16D 55/226 |

* cited by examiner

[Fig. 1]
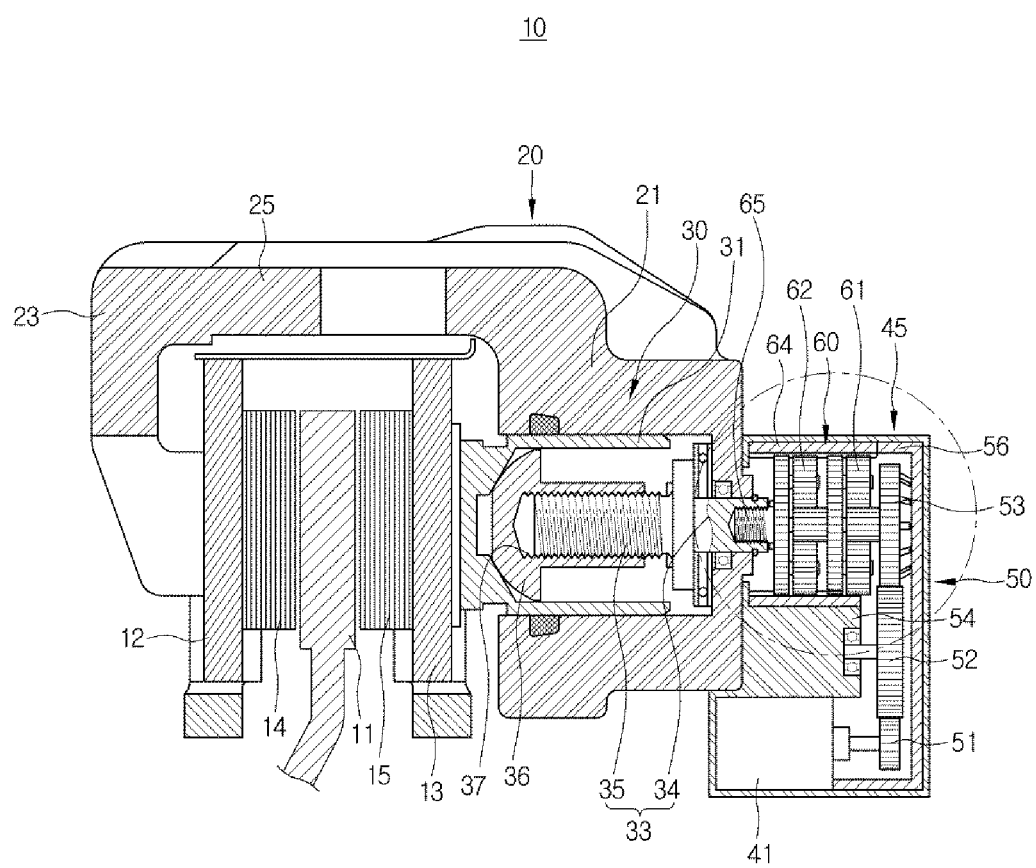

[Fig. 2]
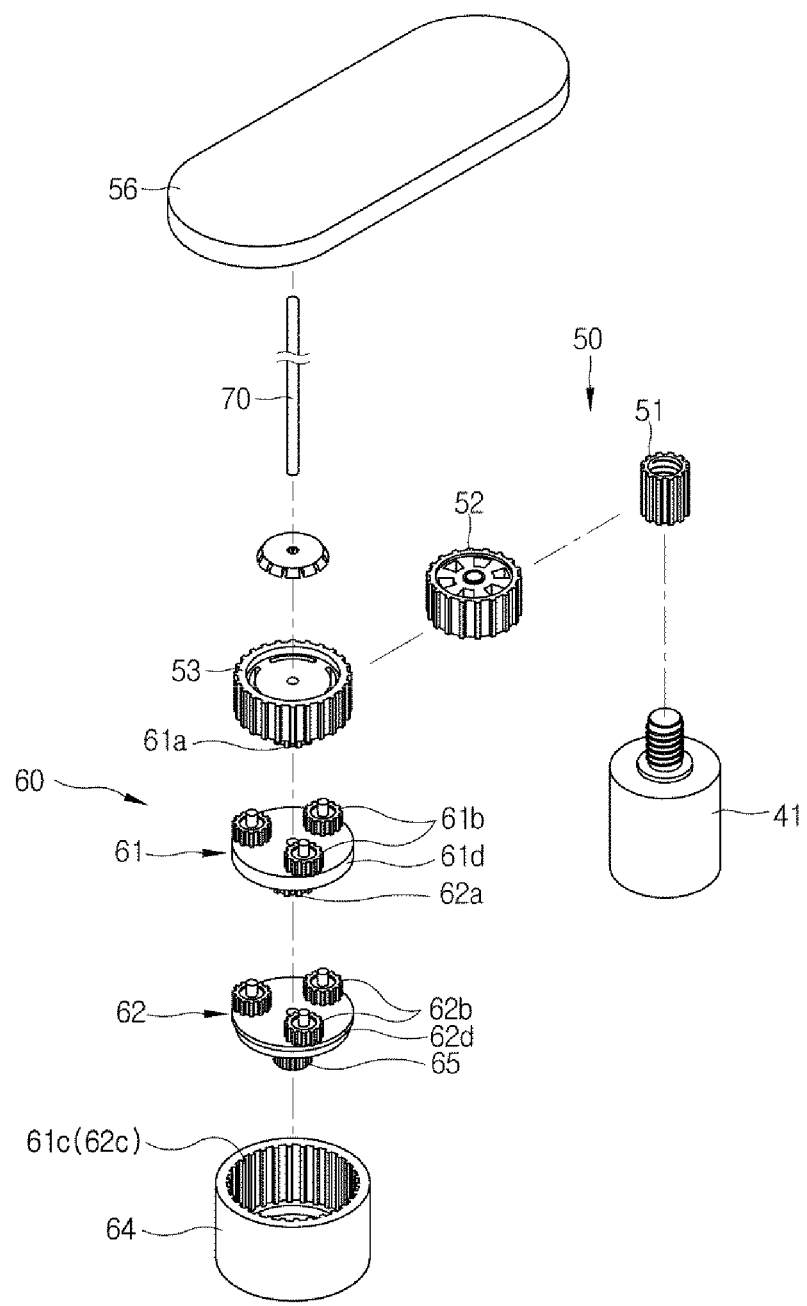

[Fig 3]
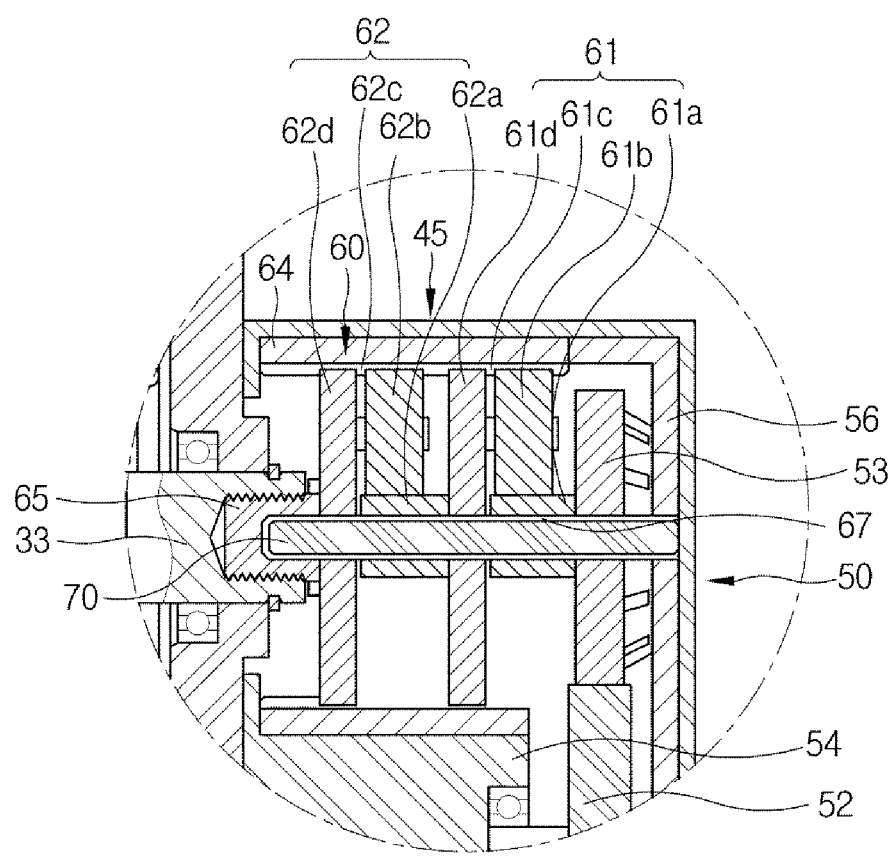

ELECTRONIC DISC BRAKE

CROSS-REFERENCE TO RELATED APPLICATION

This application claims the benefit of Korean Patent Application No. 2015-0133874, filed on Sep. 22, 2015 in the Korean Intellectual Property Office, the disclosure of which is incorporated herein by reference.

BACKGROUND

1. Field

The present disclosure relates to an electronic disc brake, and more particularly, to an electronic brake system capable of realizing a parking function by an operation of an electric motor.

2. Description of the Related Art

Generally, a brake device is a device for stopping a vehicle to prevent the vehicle from moving when the vehicle is braked or parked and serves to hold wheels of the vehicle to prevent the wheels from rotating.

An electronic parking brake (EPB) system that electronically controls an operation of a parking brake is widely used nowadays and is mounted on a typical disk brake to perform a function of the parking brake. Types of electronic disc brakes include a cable puller type, a motor-on-caliper (MOC) type, and a hydraulic parking brake type.

RELATED ART DOCUMENT

Korean Patent Publication No. 10-2011-0072877 (Jun. 29, 2011)

The above document relates to an MOC type EPB actuator structure in which a motor generating power is connected to an actuator, and the power generated by the motor is transmitted to the actuator and a caliper by increasing torque while decelerating using a plurality of gear devices to perform a braking operation.

However, the plurality of gear devices installed for transmitting power has an adverse effect in terms of operating noise when braking. For example, an imprecise control of a coupling (an engagement) between gears may cause noise and vibration to be generated when the actuator operates and may degrade a durability of the actuator in more serious cases. Thus, a variety of research and development is underway to reduce operating noise of an electronic disc brake that uses a motor to automatically operate a brake.

SUMMARY

Therefore, it is an aspect of the present disclosure to provide an electronic disc brake in which a connection structure between elements such as a connection unit that transmits a driving force of a motor and a deceleration unit that decreases a rotational force is improved.

Additional aspects of the disclosure will be set forth in part in the description which follows and, in part, will be obvious from the description, or may be learned by practice of the disclosure.

In accordance with one aspect of the present disclosure, an electronic disc brake includes a disc, a caliper housing, and an actuator. The disc may be configured to rotate with vehicle wheels. The caliper housing maybe configured to operate pad plates installed at both sides of the disc. The actuator may have a piston provided inside the caliper housing to press the pad plates to adhere the pad plates to the disc, a spindle rotatably installed at the caliper housing to reciprocate the piston, an electric motor configured to rotate the spindle, and a decelerator configured to transmit a rotational force of the electric motor to the spindle. The decelerator may include a power connection unit connected to the electric motor, planetary gear units configured to connect the power connection unit to the spindle, and a center pin configured to pass through the power connection unit and the planetary gear units. The center pin is fitted into the power connection unit and the planetary gear units to be rotatable relative thereto.

The power connection unit may include a driving gear provided at a shaft of the electric motor and a driven gear connected to the planetary gear units, the planetary gear units may include a first planetary gear unit and a second planetary gear unit for multi-stage deceleration, each of the first planetary gear unit and the second planetary gear unit may include a sun gear, a plurality of planetary gears engaged to an outer portion of the sun gear, a ring gear which is an internal gear configured to accommodate the planetary gears, and a carrier installed to rotatably support the planetary gears and coaxially rotate with the sun gear and configured to output a rotational power, and the center pin may be spaced apart from and slidably and rotatably provided at a central hole provided at central portions of the driven gear of the power connection unit and the sun gear and the carrier of each of the first and second planetary gear units.

The decelerator may further include a housing cap configured to surround the power connection unit and the planetary gear units, the carrier of the second planetary gear unit may include an output shaft coupled to the spindle, and both ends of the center pin are rotatably supported by the housing cap and the output shaft, respectively.

Grease may be applied between the center pin and the decelerator through which the center pin passes.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a cross-sectional view illustrating an electronic disc brake according to an embodiment of the present disclosure;

FIG. 2 is an exploded perspective view of a part of the electronic disk brake according to the embodiment; and FIG. 3 is an enlarged cross-sectional view of a part of the electronic disc brake according to the embodiment.

DETAILED DESCRIPTION

Hereinafter, embodiments of the present disclosure will be described in detail with reference to the accompanying drawings. Embodiments to be introduced below are provided as examples to sufficiently convey the spirit of the present disclosure to those of ordinary skill in the art to which the present disclosure pertains. The present disclosure is not limited to the embodiments to be described below and may also be embodied in other forms. To clearly describe the present disclosure, parts unrelated to the description have been omitted from the drawings, and widths, lengths, thicknesses, and the like of elements in the drawings may be exaggerated for convenience. Like reference numerals refer to like elements throughout.

FIG. 1 is a cross-sectional view illustrating an electronic disc brake according to an embodiment of the present disclosure, and the electronic disc brake illustrated in the drawing is a motor-on-caliper (MOC) type. FIG. 2 is an exploded perspective view of a part of the electronic disk brake according to the embodiment, and FIG. 3 is an enlarged cross-sectional view of a part of the electronic disc brake according to the embodiment.

Referring to the drawings, an electronic disc brake 10 of the embodiment includes a disc 11 configured to rotate with vehicle wheels, a carrier (not illustrated) on which a pair of pad plates 12 and 13 to which disc pads 14 and 15 are respectively attached are installed by being spaced apart from each other at a predetermined interval, a caliper housing 20 slidably installed at the carrier to operate the pad plates 12 and 13, and an actuator 30 having a piston 31 installed to be movable back and forth inside the caliper housing 20.

The caliper housing 20 is slidably installed at the carrier by a pair of guide rods (not illustrated), and the caliper housing 20 includes a cylinder unit 21 in which the piston 31 is inserted, a finger unit 23 configured to operate an outer pad plate 12 to be described below, and a connection unit 25 configured to connect the finger unit 23 to the cylinder unit 21.

The carrier is mounted on a knuckle of a vehicle body by a mounting bolt, and the caliper housing 20 is slidably coupled to both end portions of the carrier by the guide rods.

The disc pads 14 and 15 are attached to inner surfaces of the pair of pad plates 12 and 13, respectively. The pad plates 12 and 13 include an inner pad plate 13 disposed so that an outer surface thereof is in contact with a front end of the piston 31 and the outer pad plate 12 disposed so that an outer surface thereof is in contact with the finger unit 23.

The actuator 30 includes the piston 31 slidably inserted into the cylinder unit 21 of the caliper housing 20, a spindle 33 rotatably installed inside the cylinder unit 21 of the caliper housing 20, a nut spindle 36 installed inside the piston 31 to press the piston 31 or release the pressing of the piston 31 while moving back and forth by a rotation of the spindle 33, an electric motor 41 configured to rotate the spindle 33, and a decelerator 45 configured to transmit a rotational force of the electric motor 41 to the spindle 33.

The piston 31 is slidably inserted into the cylinder unit 21 as described above, and the piston 31 is provided in a cylindrical shape in which the inside thereof is recessed in a cup shape.

The spindle 33 has a support part 34 rotatably supported at a rear end side of the cylinder unit 21 and a male screw part 35 configured to extend a predetermined length into an inner central portion of the piston 31 from the support part 34.

The nut spindle 36 is formed in a cylindrical shape and includes a female screw portion 37, which is fastened to the male screw portion 35 of the spindle 33, formed at an inner surface thereof to move back and forth in an axial direction by the rotation of the spindle 33. Consequently, when the spindle 33 rotates in a forward direction or a reverse direction, the nut spindle 36 moves back and forth and presses the piston 31 such that braking occurs.

The electric motor 41 receives power by manipulation of a switch (not illustrated) provided at a driver seat of the vehicle and converts electrical energy into mechanical rotational kinetic energy. A braking operation according to an operation signal of the switch is controlled by an electronic control unit (ECU) of the vehicle which is not illustrated.

The decelerator 45 includes a power connection unit 50 and a plurality of planetary gear units 60.

The power connection unit 50 connects a shaft of the electric motor 41 to the planetary gear units 60. The power connection unit 50 may include a driving gear 51 provided at the electric motor 41, a driven gear 53 connected to the planetary gear units 60, and an intermediate gear 52 that connects the driving gear 51 to the driven gear 53 between the driving gear 51 and the driven gear 53.

In addition, the power connection unit 50 may further include a frame 54 configured to maintain distances between shafts of the driving gear 51, the intermediate gear 52, and the driven gear 53 and configured to support the shaft of the intermediate 52.

Here, the number of teeth of the gears preferably increases from the driving gear 51 toward the driven gear 53 in the power connection unit 50 so that a rotation of the electric motor 41 may be decelerated and transmitted to the planetary gear units 60.

In addition, the electric motor 41 is installed to a side of the planetary gear units 60 and is disposed so that a central axis line thereof is parallel to a central axis line of the planetary gear units 60. When the electric motor 41 is disposed to the side of the decelerator 45 so that the central axis line of the electric motor 41 is parallel to the central axis line of the planetary gear units 60 as described above, an overall length of the electronic disc brake may be shortened. An undescribed reference numeral 56 refers to a housing cap configured to cover the decelerator 45 and the electric motor 41.

To obtain a large reduction gear ratio by multi-stage deceleration, the planetary gear units 60 include first and second planetary gear units 61 and 62 continuously connected from the power connection unit 50 connected to the electric motor 41 to the spindle 33.

The first and second planetary gear units 61 and 62 respectively include sun gears 61a and 62a, a plurality of planetary gears 61b and 62b engaged to outer portions of the sun gears 61a and 62a, ring gears 61c and 62c which are internal gears configured to accommodate the planetary gears 61b and 62b, and carriers 61d and 62d installed to rotatably support the planetary gears 61b and 62b and to coaxially rotate with the sun gears 61a and 62a and configured to output rotational power.

Although it is illustrated that the sun gear 61a of the first planetary gear unit 61 is integrally provided with the driven gear 53 of the power connection unit 50 and that the sun gear 62a of the second planetary gear unit 62 is integrally provided with the carrier 61d of the first planetary gear unit 61 in the embodiment, this may be properly modified and changed by an ordinary technician by bonding or coupling. In addition, the ring gears 61c and 62c may be provided by forming a gear at an inner surface of a housing body 64 in a cylindrical shape.

Here, the decelerator 45 will be briefly described again. The sun gear 61a of the first planetary gear unit 61 is connected to the driven gear 53 of the power connection unit 50 connected to the electric motor 41 by a gear, and the sun gear 62a of the second planetary gear unit 62 is connected to a central shaft of the carrier 61d which is an output side of the first planetary gear unit 61. That is, the plurality of planetary gear units 61 and 62 are continuously coupled in the above manner, and finally, the carrier 62d of the second planetary gear unit 62 is connected to the spindle 33 of the actuator by using an output shaft 65.

Consequently, according to the embodiment, the decelerator 45 may miniaturize the electric motor 41 which is a driving source and still rotate the spindle 33 with great force. Thus, when, for example, an operation of the electric motor 41 is stopped while braking is performed, the rotation of the spindle 33 is limited by the large reduction gear ratio of the decelerator 45 such that a braking state may be remained.

Meanwhile, the gears of the decelerator 45 described above, e.g., the driven gear 53 of the power connection unit 50 and the sun gears of the first and second planetary gear units 61 and 62, and central shafts of the carriers may be aligned on the same axis by using a center pin 70.

As illustrated in FIG. 3, one end of the center pin 70 is rotatably coupled to the housing cap 56 and the other end thereof is rotatably coupled to the output shaft 65 by passing through the planetary gear units 60. The housing cap 56 has a pin hole in the form of a through-hole so that the center pin 70 is slidably and rotatably fitted thereinto, and the output shaft 65 also has a shaft hole recessed in a predetermined depth so that the center pin 70 is slidably and rotatably fitted thereinto. Although not illustrated, bearings may be interposed between the center pin, the housing cap, and the output shaft to facilitate rotation.

In addition, the center pin 70 is spaced apart from and fitted into a central hole 67 provided at central portions of the sun gear 61a and the carrier 61d of the first planetary gear unit 61 and the sun gear 62a and the carrier 62d of the second planetary gear unit 62 through which the center pin 70 passes to be slidably rotatable.

Since the center of the decelerator 45 is centered by the center pin 70 spaced a predetermined distance apart from and slidably and rotatably coupled to the driven gear 53 and the sun gears and the carriers of the first and second planetary gear units 61 and 62, the decelerator 45 may effectively reduce power loss and noise caused by torsion of a gear when power is transmitted using a plurality of gears. Furthermore, assembling the decelerator is eased. Although not illustrated in detail, a lubricating material such as grease may be applied between the central hole 67 of the driven gear 53, the sun gears 61a and 62a, and the carriers 61d and 62d of the decelerator and the center pin 70 which are spaced apart from each other to prevent the introduction of foreign substances and to facilitate smooth rotation.

A braking operation of an electronic disc brake having the above structure is performed as below.

When a driver manipulates a parking switch provided near a driver seat of a vehicle for braking (including parking), the electric motor 41 rotates. The rotation of the electric motor 41 is decelerated through the decelerator 45 and rotates the spindle 33 with a great force.

The nut spindle 36 moves in the axial direction when the spindle 33 rotates, and braking is performed as the nut spindle 36 presses the piston 31.

After braking is performed, the electric motor 41 stops operating, and the rotation of the spindle 33 is prevented since the decelerator 45 has a large reduction gear ratio. Accordingly, the braking state is maintained without change as long as the electric motor 1 does not operate again.

When the driver releases braking, the driver manipulates the parking switch near the driver seat to release the braking. Here, since the electric motor 41 rotates in a reverse direction of braking and the spindle 33 rotates in the reverse direction of braking, the nut spindle 36 releases the pressing of the piston 31 and thus the braking is released.

According to an embodiment of the present disclosure, by centering gears of a power connection unit and planetary gear units of a decelerator on the same axis using a center pin, power loss and noise caused by a misalignment of the gears can be reduced.

In addition, according to an embodiment of the present disclosure, an electronic disc brake includes a center pin slidably and rotatably installed inside a decelerator while being spaced apart from the centers of gears such that convenience of assembling is high, and even when a coupling of any one gear among the gears is torqued, a possibility of affecting a coupling of the other gears can be lowered.

The disclosed embodiments have been described above with reference to the accompanying drawings. Those of ordinary skill in the art to which the present disclosure pertains should understand that the present disclosure may be practiced in forms different from the disclosed embodiments without changing the technical spirit or essential features of the present disclosure. The disclosed embodiments are merely illustrative and are not to be construed as limiting.

What is claimed is:

1. An electronic disc brake comprising:
   a disc configured to rotate with vehicle wheels;
   a caliper housing configured to operate pad plates installed at both sides of the disc; and
   an actuator having a piston provided inside the caliper housing to press the pad plates to adhere the pad plates to the disc, a spindle rotatably installed at the caliper housing to reciprocate the piston, an electric motor configured to rotate the spindle, and a decelerator configured to transmit a rotational force of the electric motor to the spindle, wherein:
   the decelerator includes a power connection unit connected to the electric motor, planetary gear units configured to connect the power connection unit to the spindle, and a center pin configured to pass through the power connection unit and the planetary gear units;
   the center pin is fitted into the power connection unit and the planetary gear units to be rotatable relative thereto; and
   one end of the center pin is slidably and rotatably coupled to a housing cap of the decelerator.

2. The electronic disc brake of claim 1, wherein:
   the power connection unit includes a driving gear provided at a shaft of the electric motor and a driven gear connected to the planetary gear units;
   the planetary gear units include a first planetary gear unit and a second planetary gear unit for multi-stage deceleration;
   each of the first planetary gear unit and the second planetary gear unit includes a sun gear, a plurality of planetary gears engaged to an outer portion of the sun gear, a ring gear which is an internal gear configured to accommodate the planetary gears, and a carrier installed to rotatably support the planetary gears and coaxially rotate with the sun gear and configured to output a rotational power; and
   the center pin is spaced apart from and slidably and rotatably provided at a central hole provided at central portions of the driven gear of the power connection unit and the sun gear and the carrier of each of the first and second planetary gear units.

3. The electronic disc brake of claim 2, wherein:
   the decelerator further includes the housing cap configured to surround the power connection unit and the planetary gear units;
   the carrier of the second planetary gear unit includes an output shaft coupled to the spindle; and
   both ends of the center pin are rotatably supported by the housing cap and the output shaft, respectively.

4. The electronic disc brake of claim 1, wherein a grease is applied between the center pin and the decelerator through which the center pin passes.

5. The electronic disc brake of claim 1, wherein an other end of the center pin is rotatably coupled to an output shaft coupled to the spindle.

6. The electronic disc brake of claim 5, wherein the housing cap of the decelerator has a hole to which the one end of the center pin is rotatably coupled.

7. The electronic disc brake of claim 5, wherein the output shaft has a recess which the other end of the center pin is rotatably coupled.

* * * * *